United States Patent [19]

Schwochert

[11] 4,342,799
[45] Aug. 3, 1982

[54] HOLLOW BODIES AND THEIR MANUFACTURE

[75] Inventor: Hans-Joachim Schwochert, Bonn-Holzlar, Fed. Rep. of Germany

[73] Assignee: Kautex-Maschinebau GmbH, Fed. Rep. of Germany

[21] Appl. No.: 159,252

[22] Filed: Jun. 13, 1980

[30] Foreign Application Priority Data

Jun. 15, 1979 [DE] Fed. Rep. of Germany ....... 2924198

[51] Int. Cl.³ .................. B29F 1/10; B65D 41/06; B29H 9/00
[52] U.S. Cl. .................. 428/35; 264/515; 264/516; 264/267; 264/273; 220/283; 220/293; 220/295
[58] Field of Search .......... 264/516, 267–269, 264/273, 325, 515; 428/35; 156/69, 120; 220/283, 293, 295

[56] References Cited

U.S. PATENT DOCUMENTS

| | | | |
|---|---|---|---|
| 2,715,085 | 8/1955 | Boger | 428/35 |
| 2,779,061 | 1/1957 | Hosking | 156/120 |
| 3,742,995 | 7/1973 | Confer | 264/310 X |
| 4,010,052 | 3/1977 | Edwards | 156/120 |
| 4,213,933 | 7/1980 | Cambio | 264/515 |
| 4,307,059 | 12/1981 | Cambio | 264/516 |

FOREIGN PATENT DOCUMENTS

| | | |
|---|---|---|
| 1852986 | 6/1962 | Fed. Rep. of Germany . |
| 2558317 | 7/1977 | Fed. Rep. of Germany . |
| 524432 | 8/1940 | United Kingdom . |
| 992750 | 5/1965 | United Kingdom . |
| 1544504 | 4/1979 | United Kingdom . |
| 1551185 | 8/1979 | United Kingdom . |

*Primary Examiner*—William R. Dixon, Jr.
*Attorney, Agent, or Firm*—Steele, Gould & Fried

[57] ABSTRACT

A blow-moulded hollow body has an insert anchored in a wall of the hollow body by wall portions which penetrate openings in a projecting portion of the insert from both sides during the blow-moulding process and which are welded together at these openings. A wall portion of the hollow body is afterwards cut away to form an access opening and the insert is adapted to receive a closure cap for this opening. In another embodiment, the insert has a carrying handle attached thereto.

18 Claims, 10 Drawing Figures

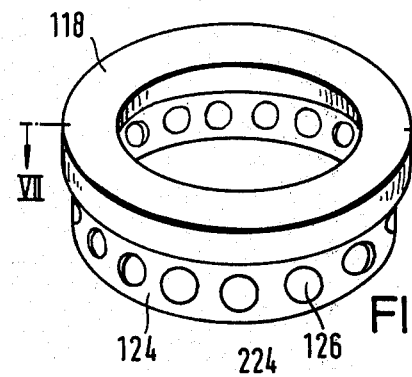
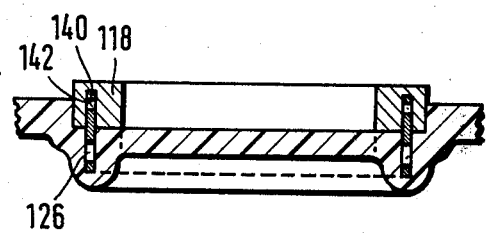
FIG. 6  FIG. 7
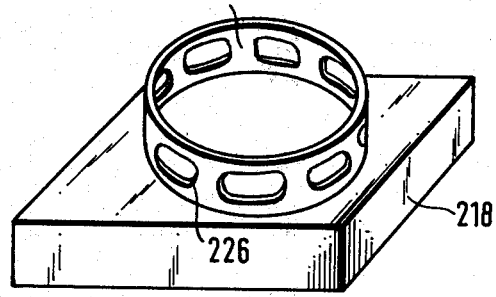
FIG. 8
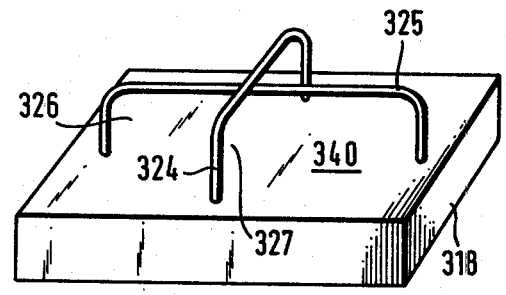
FIG. 9
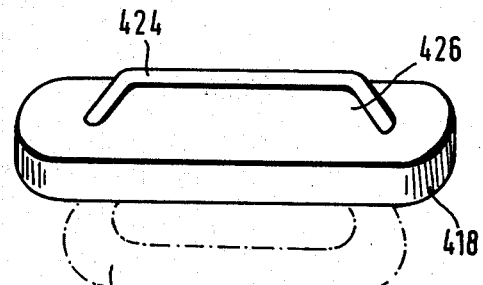
FIG. 10

HOLLOW BODIES AND THEIR MANUFACTURE

The invention relates to a method of producing hollow bodies, which are made of thermoplastic material by expanding a parison in a blow mould, and which are provided with inserts and to thermoplastic hollow bodies which are provided with inserts.

A method of setting inserts in blow-moulded bodies is described in German Gebrauchsmuster (Utility Model) No. 1 852 986. If the positively attached inserts are secured to continuous wall regions of the hollow body, i.e. wall regions which have no opening, there is an inevitable interdependance between the extent of the positive joint and the extent of the stretching experienced by the wall region of the hollow body, producing the positive joint, during the expansion process. If there is no welded joint between the wall of the hollow body and the regions of the insert which are immediately adjacent the wall of the hollow body, there is always the danger that, because of the elastic resilience of thermoplastic materials, the regions of the hollow body wall producing the positive joint give way under the influence of strong forces, with the result that the insert works loose, changes its position or is even fully detached from the hollow body. This danger is merely reduced when the insert engages with a relatively large region of the container wall without the wall having to be specially expanded to fit the insert. Such pre-requisites exist, however, only in a few exceptional cases.

A positive joint between an insert and the wall of a container made of thermoplastic material and produced by a blow moulding process is known also from Published German Patent Specification (Offenlegungsschrift) No. 2 558 317. This publication deals substantially with rods or the like which, however, during the course of the expansion process are entirely surrounded by the thermoplastic material forming the wall, so that they are not accessible from the outside.

An object of the invention is to enable inserts to be attached at desired places on the hollow body, irrespective of whether they are heat-sealable or not with the material forming the hollow body wall, so that a satisfactory joint is ensured with all the manipulations which occur during practical operation. The shape and function of these inserts should not be governed by any restrictions. The blowing process to produce the hollow bodies should not be at all complicated nor expensive. This object also applies to the production of the inserts.

The invention resides in a method of making a hollow body, of thermoplastic material, in which a parison is expanded in a blow mould, and in which, during the course of the expansion process, respective wall portions of the parison penetrate from both sides at least one opening in an insert, and the two wall portions heat-seal together at the opening and enclose the regions of the insert surrounding the opening so as to produce a positive joint between the insert and the thermoplastic material.

This procedure renders possible a satisfactory and permanent joint between the insert and the hollow body wall even when the insert, or respectively its region which is provided with the opening or the openings, is made of a material which cannot be heat-sealed with the plastics material forming the container wall. It is also significant that the invention provides the possibility of taking into account the particular requirements concerning the material properties and the method of production by the appropriate selection of the number and/or the position and/or the size of the openings or respectively the wall parts defining them, which are surrounded by plastics material. Thus, for example, one may be concerned with the viscosity of the plastics material which is to penetrate the opening from both sides and produce a welded joint in the region of the opening. The size of the welding areas will also be significant for the quality of the desired joint. One further factor is the extent of the deformation of the plastics material, which is necessary in connection with the production of the positive joint, deviating from the normal line of the wall in this region. Thus, as already mentioned in connection with the discussion of the prior art, the attempt is made generally to avoid too intensive an expansion of the material, since this necessarily leads to a reduction in the wall thickness in this specially expanded region. By using the method according to the invention, all these requirements or special features may easily be taken into account, irrespective of the design and the size of the insert. It is merely necessary to make the openings in the insert or on a projection thereof in any suitable manner or for the openings to be defined by means of the projection, and it is then always possible for the person skilled in the art to design the openings and also the adjoining regions of the projection, which are surrounded by the thermoplastic material, so that all the practical requirements concerning the production of the desired positive joint and also the durability of same in practical operation are taken into account. Thus, it should be generally appropriate to select the design of the insert at least in the region with possesses the opening or openings, so that corners, edges, sharp transitions and the like are avoided, i.e. those designs which strain the impact resistance of the plastics material more than necessary.

The invention includes a hollow body made of thermoplastic material and having at least one insert which is positively joined to the wall of the hollow body, by wall portions of the thermoplastic material which penetrate at least one opening in the insert from both sides and are heat-sealed together in the region of this opening so that at least the portions of the insert around this opening are surrounded by the thermoplastic material.

The portion of the insert which possesses the opening or openings may be of an annular construction, the axis of the ring being advantageously substantially at right angles to the wall of the hollow body in the region of the insert. Such a design will be appropriate when the insert forms the rim of an access opening which is sealable by means of a closure cap. The openings in the insert may be defined or formed by a rod or bar-shaped part, which is a ring lying substantially parallel to the main plane of the wall of the hollow body in the region of the insert, and by crossfits, which run substantially at right angles to the main plane of said wall. Another possibility is to provide a flat portion section, for example a sheet metal strip which can be curved, if need be, to form a ring, with at least one opening. The at least one opening may also be formed by at least one U-shaped projection of the insert. If the actual insert itself is made of plastics material, the joint between the insert and the metallic core or the like, which will generally consist of wire, may be produced in turn by applying the teaching according to the invention, i.e. that the ends of the core are shaped to form hooks or eyes, through which the plastics material of the insert penetrates, so that a positive joint is also produced here between the U-shaped part and the plastics material of the insert body. Depending upon the strain to which the joint between the hollow body wall and the insert is to be subjected, it may also be appropriate, or even necessary, to dispose two or more openings or rows of openings one behind the other. Then, however, in this case, the maximum stretchability of the material forming the wall should be taken into consideration.

One embodiment has proved to be particularly advantageous, wherein the main plane of the opening or openings and/or of the parts defining them or of a tangential plane adjacent thereto extends substantially perpendicular to the main plane of the hollow body wall in the region of the insert. During production of the positive joint, the material forming the hollow body wall will generally experience the minimum stretching and therewith a reduction in the wall thickness. However, cases are undoubtedly also conceivable in which the main plane of the opening or openings extends in a different manner, for example parallel to the main plane of the hollow body wall in the region where the insert is located. This would then be the case, for example, when the openings are made on a projection of an insert which is, for example, annular and which is bent like a flange towards the outside or the inside relative to the main axis of the annular insert.

Irrespective of the actual design, it will be appropriate, in the majority of cases, to give a rounded cross-section to the regions of the boundaries of the openings, which regions are surrounded by the portions of plastics material which have penetrated the or each opening, or, in any event, to design them so that impact stresses on the plastics material are avoided or kept low, especially when tensile forces occur in the region of the joint.

The insert and/or the projection of same may be made of a metallic material, for example sheet steel. However, it is also possible to make the inserts and/or projections of plastics material which may be provided with metallic reinforcing cores.

The invention is further described, by way of example, with reference to the drawings, in which:

FIG. 6 is a perspective view of a second embodiment of an insert;

FIG. 7 is a section along the line VII—VII of FIG. 6; and

FIGS. 8 to 10 are perspective views of further embodiments of inserts.

Figure 1:
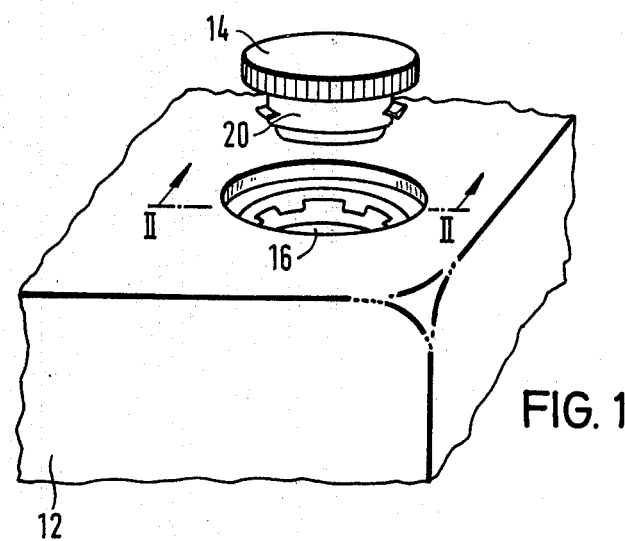
FIG. 1 is a perspective view of a portion of a hollow body provided with an insert.

A tank-like hollow body 12 shown in FIG. 1 is provided with an opening 16 which is sealable by means of a closure cap 14. The rim of the opening is defined by an annular insert 18 appropriate portions of which are designed in a conventional manner so that a projection 20 of the cap 14 and the insert 18 engage one with the other in a bayonet fashion. To produce a tight joint, which must also be guaranteed even after frequent removal and re-application of the closure cap 14, the insert 18 is made of sheet steel. Inserts of this type have hitherto been fitted by being first of all sprayed all round with plastics material and then being tightly joined to the wall 22 of the hollow body 12 by means of friction-welding.

Figure 2:
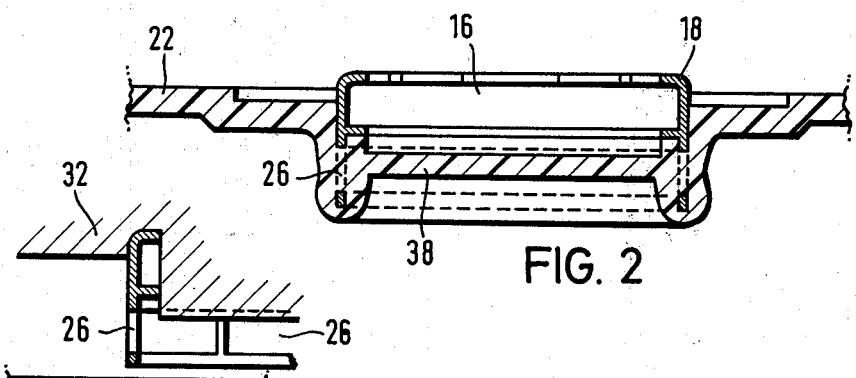
FIG. 2 is a section along line II—II of FIG. 1.
Figure 3:
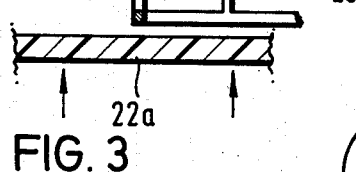
FIGS. 3 and 4 are fragmentary sectional views showing two successive steps of the manufacturing process relevant to the embodiment of FIG. 2.
Figure 4:
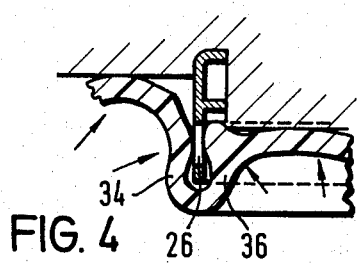
Figure 5:
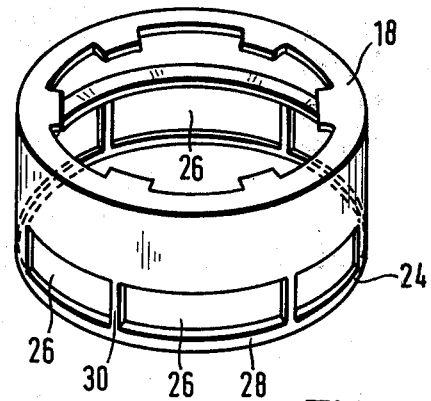
FIG. 5 is a perspective view of the insert shown in FIGS. 1 to 4.

Contrary thereto, in the method according to the invention, the wall 22a of the preformed piece or parison, from which the hollow body 12 is produced, is pressed against a projection 24, also annular, of the unsheathed insert 18 during the blowing process. The projection 24 is provided with openings 26 which are defined on the inside, i.e. on the side facing the wall of the hollow body 12, by an annular part or ring 28 which is connected to the body of the insert 18 by crossfits 30. The insert 18 is first of all secured in a blow mould 32 in a suitable manner so that, during the course of the blowing process, it is surrounded by thermoplastic material. In the region of the projection 24, the thermoplastic material flows around the annular part 28 on both sides thereof. Under the effect of the blowing pressure, and the resultant partial streams, which are shown in FIG. 4 of the drawing and are denoted by 34 and 36, the thermoplastic material is pressed into the openings 26. The two portions thereof at the inside and outside of the projection 24 become joined together, as per the drawing of FIG. 2, and form a welded joint. This occurs, as stated, due to the effect of the blowing pressure which generally does not exceed about 3 to 6 bars. The result is an absolutely positive joint between the metallic insert 18 and the thermoplastic material, and it meets the highest demands, such as are necessary, for example, in the case of vehicle fuel tanks and the like. To produce the opening 16, it is then merely necessary to remove the wall region 38 (FIG. 2) within the insert 18 by means of a cutting or milling process.

In the embodiment shown in FIGS. 6 and 7, an insert 118, also annular, is shown, but it is made of plastics material and is provided with a reinforcing core 140 having an unsheathed projection 124 which protrudes inwardly and, like the projection 24 of the insert 16, is provided with openings 126 which produce a positive joint in the same way as in the embodiment shown in FIGS. 1 to 5 during the expansion of the parison to form the definitive shape of the hollow body. The region of the reinforcing core 140, which is embedded in the annular insert 118, is also provided with openings 142 which also serve to produce a positive joint between the plastics material of the insert 118 and the reinforcing core 140. However, it will be possible to make the openings 142 smaller than the openings 126 since the production of the insert 118 or rather the joint between the insert 118 and the reinforcing core 140 occurs in the injection-moulding process, wherein pressures are used which are quite considerably higher than in the blow method to which the invention relates.

The insert shown in FIGS. 6 and 7 will also serve to define an opening in a hollow body or to accommodate a closure member or the like. Inserts may, of course, also have other functions. For example, the attachment of a carrying handle may be involved. This is common in the case of relatively large hollow bodies, i.e. for example, tanks, barrels and the like having a volume of, for example, 20 to 3000 l. For this purpose, a plate-shaped insert may be used which does not generally need to have an opening and is provided on the outside with hooks, eyes or the like, to which a handle may possibly be pivotably attached. FIG. 8 shows an insert 218 of this type which comprises a plastics plate provided with an annular projection 224 made of sheet metal or the like. This projection 224, which has openings 226, may be embedded similarly in the plastics material of the insert 218 and be positively joined thereto like the core 140 of the embodiment shown in FIGS. 6 and 7.

In the embodiment shown in FIG. 9, the insert 318 is also plate-shaped. In this case, the positive joint is produced by U-shaped projections 324, 325 which are attached to the body of the insert 318 in a crosswise manner. The projections 324 and 325 may also be made of metal. In this case, the openings 326 and 327 are defined by the U-shaped projections, on the one hand, and by the inside surface 340 of the insert 318. This applies also to the embodiment shown in FIG. 10, wherein merely a U-shaped projection 424 is provided which, jointly with the body of the insert 418, also plate-shaped, defines an opening 426 for making the positive joint with the plastics material forming the hollow body wall. A handle 442 is shown in chain-dotted lines.

If necessary, it may be appropriate to provide the inserts with small ventilation openings, especially when they are of a flat construction; air which is located between the insert and the approaching wall of the parison can escape to the outside through these ventilation openings. This prevents air pockets from being produced which might possibly impair the strength and/or tightness of the joint.

The embodiments reveal that, irrespective of the shape and the function of the insert, this insert may be securely anchored in the wall of the hollow body even when, in practice, the insert remains accessible from the outside over its entire extent, which runs substantially parallel to the main plane of the wall, i.e. it is not engaged by the hollow body wall on the outside, although the method according to the invention does not exclude this possibility. The shape and size of the insert may therefore be selected so that it can adopt the function intended therefor on the finished hollow body in an optimum manner. It will normally not be necessary to select the size and shape of the insert with regard to the production of a satisfactory joint.

We claim:

1. A method of making hollow bodies, comprising the steps of:
   providing a blow-mold having an inner surface conforming to a desired external shape for the hollow body, the inner surface having at least one continuous area;
   providing an insert with an extending portion having at least one opening therein, the insert to be attached to the hollow body at the continuous area, the opening being aligned substantially perpendicular to the extending portion;
   supporting the insert at the inner surface of the blow-mold in the continuous area, said extension extending inwards toward the hollow body, and said at least one opening defining an axis substantially parallel to the continuous inner surface of the mold and,
   expanding a thermoplastic parison in the blow-mold and, during said expansion, causing wall portions of the parison to penetrate said at least one opening from opposite sides and to become heat-sealed together at said at least one opening and to enclose the regions of the insert surrounding the openings so as to produce a positive joint between the insert and the thermoplastic material.

2. The method of claim 1, further comprising removing a portion of the thermoplastic material in a part of the continuous area bounded by the insert.

3. A hollow body comprising:
   a continuous wall portion made of thermoplastic material;
   at least one insert; and,
   means positively securing said insert to said hollow body wall, said securing means comprising at least one opening in said insert, the at least one opening being in a part of the insert disposed substantially perpendicular to and intersecting the hollow body wall, the at least one opening defining an axis substantially parallel to the wall, and portions of the material forming said wall penetrating said at least one opening, said portions being heat-sealed together at and adjacent said opening, whereby regions of the insert surrounding such openings are embraced by said wall material portions.

4. A hollow body according to claim 3, in which said insert has a projection thereon, said opening being defined by said projection.

5. A hollow body according to claim 3, in which said insert has an annular portion, said at least one opening being formed in said annular portion, the annular portion having an axis substantially at right angles to said wall of the hollow body.

6. A hollow body according to claim 3 in which said insert has a ring which is substantially parallel to the main plane of said wall, and crossbits which are substantially at right angles to said main plane of said wall, said at least one opening being defined by said ring and said crossbits.

7. A hollow body according to claim 3, in which said insert has at least one U-shaped projection, said opening being defined by said U-shaped projection.

8. A hollow body according to claim 3, in which said insert defines at least two openings or rows of openings disposed one behind the other in the direction of flow towards one another of the two wall portions to be heat sealed together.

9. A hollow body according to claim 3 in which the regions of the insert, which are surrounded by the thermoplastic material have a rounded cross-section.

10. A hollow body according to claim 3, in which at least the portion of said insert defining said opening comprises metal.

11. A hollow body according to claim 3, in which said insert at least partly comprises plastics material.

12. A hollow body according to claim 11, in which said insert further comprises a metallic core.

13. A hollow body according to claim 12 in which said opening is defined by said metallic core.

14. A hollow body according to claim 3, in which said insert defines an access opening to the interior of said hollow body and has means thereon adapted to receive and engage a closure cap for said access opening.

15. A hollow body according to claim 3, in which said insert has a carrying handle thereon.

16. A hollow body according to claim 3, wherein the insert is located in a continuous area of the hollow body wall and said at least one opening is located on a portion of the insert extending toward the hollow inside of said hollow body.

17. A hollow body according to claim 3, wherein said at least one opening is located on a portion of the insert protruding toward the hollow inside of said hollow body, whereby the protruding portion of the insert is embraced by said wall material while the insert remains accessible along remaining surfaces thereof.

18. The hollow body of claim 3, wherein an access opening is formed in the continuous wall portion at an area bounded by the insert.

* * * * *

UNITED STATES PATENT AND TRADEMARK OFFICE
CERTIFICATE OF CORRECTION

PATENT NO. : 4,342,799
DATED : August 3, 1982
INVENTOR(S) : Hans-Joachim Schwochert It is certified that error appears in the above-identified patent and that said Letters Patent are hereby corrected as shown below:

Column 2, line 34, "with" should read --which--.

Signed and Sealed this

Fifth Day of October 1982

[SEAL]

Attest:

GERALD J. MOSSINGHOFF

Attesting Officer

Commissioner of Patents and Trademarks